United States Patent
Trask et al.

(10) Patent No.: US 9,235,911 B2
(45) Date of Patent: Jan. 12, 2016

(54) RENDERING AN IMAGE ON A DISPLAY SCREEN

(75) Inventors: Joshua Trask, Amherst, MA (US); Antoine Labour, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 900 days.

(21) Appl. No.: 13/358,357

(22) Filed: Jan. 25, 2012

(65) Prior Publication Data

US 2015/0213632 A1    Jul. 30, 2015

(51) Int. Cl.
| | |
|---|---|
| *G09G 5/00* | (2006.01) |
| *G06T 11/60* | (2006.01) |
| *G06T 1/00* | (2006.01) |
| *G06T 15/04* | (2011.01) |
| *G06T 15/60* | (2006.01) |
| *G06T 15/80* | (2011.01) |
| *G06T 15/00* | (2011.01) |
| *G06T 11/00* | (2006.01) |
| *G06F 17/22* | (2006.01) |
| *G06F 17/24* | (2006.01) |

(52) U.S. Cl.
CPC ............ *G06T 11/60* (2013.01); *G06F 17/2247* (2013.01); *G06F 17/243* (2013.01); *G06T 1/0007* (2013.01); *G06T 11/001* (2013.01); *G06T 15/005* (2013.01); *G06T 15/04* (2013.01); *G06T 15/60* (2013.01); *G06T 15/80* (2013.01); *G06T 2215/12* (2013.01)

(58) Field of Classification Search
None
See application file for complete search history.

(56) References Cited

U.S. PATENT DOCUMENTS

| | | | | |
|---|---|---|---|---|
| 7,450,123 | B1 * | 11/2008 | Kilgard ......................... | 345/426 |
| 2002/0093516 | A1 * | 7/2002 | Brunner et al. ............... | 345/629 |
| 2004/0169650 | A1 * | 9/2004 | Bastos et al. .................. | 345/426 |

OTHER PUBLICATIONS

Combining Images, printed from website http://docs.gimp.org/en/gimp-image-combining.html on Oct. 28, 2011, 5 pages.
Mitchell, Jason L., Image Processing with 1.4 Pixel Shaders in Direct3D, 2002, 15 pages.
Shader, Wikipedia, printed from website http://wikipedia.org/wiki/Shader on Oct. 27, 2011, 4 pages.
The Chromium Projects, GPU Accelerated Compositing in Chrome, printed from website http://www.chromium.org/developers/design-documents/gpu-accelerated-compositing-in . . . on Oct. 27, 2011, 9 pages.

* cited by examiner

*Primary Examiner* — David H Chu
(74) *Attorney, Agent, or Firm* — McDermott Will & Emery LLP

(57) ABSTRACT

Systems and methods for compositing image layers using a GPU shader module. Image layers may be mapped to a destination surface and tiled such that each tile has the same number and kind of mapped image layers. The mapped image layers of a tile may be provided to a shader module, such as a pixel shader, to composite the image layers into display data.

20 Claims, 5 Drawing Sheets

RENDERING AN IMAGE ON A DISPLAY SCREEN

BACKGROUND

The present disclosure relates generally to rendering images on an electronic display. The present disclosure more specifically relates to utilizing a shading module on a graphics processing unit (GPU) to composite 2-dimensional (2D) layers into a single, viewable image on the electronic display.

Many forms of consumer electronic devices may include an electronic display to convey visual information to a user. For example, a computer, smartphone, tablet computer, smart television, set-top box for a television, video game console, and other types of consumer electronic devices may provide display data to one or more electronic displays. Generating display data can be a computationally-intensive process for a device's central processing unit (CPU). For example, many video games utilize rasterized wireframe models to produce realistic images that appear 3-dimensional (3D) when viewed on a display.

Modern electronic devices may include a GPU to perform many of the computationally-intensive operations associated with generating display data. For example, a desktop computer may include a GPU on a peripheral video card. In another example, a smartphone may have a GPU integrated onto its motherboard. However, even with the ability to utilize a GPU to perform graphics calculations on certain devices, which calculations are performed and how the calculations are performed is often left to the computer programmer writing the application to decide.

SUMMARY

Implementations of the systems and methods for compositing image layers using a GPU are described herein. One implementation is a computerized method for rendering an image on a display screen of an electronic display. The method includes receiving, at a processing circuit, a plurality of image layers. The method also includes mapping the image layers to a destination surface corresponding to pixels of the display screen. The method further includes determining, by the processing circuit, one or more tiles for the destination surface, each pixel of a tile being mapped to the same number and kind of image layers. The method also includes utilizing a shader module configured to receive data indicative of the image layers mapped to the tile and configured to merge the received image layers mapped to the tile into display data. The method additionally includes providing the display data to the display screen.

Another implementation is a system for rendering an image on a display screen of an electronic display. The system includes a processing circuit that includes a CPU and a GPU. The processing circuit is configured to receive a plurality of image layers at the CPU and to map the image layers to a destination surface corresponding to pixels of the display screen. The processing circuit is also configured to determine one or more tiles for the destination surface. Each pixel of a tile is mapped to the same number and kind of image layers. The processing circuit is also configured to utilize at the GPU a shader module configured to receive data indicative of the image layers mapped to the tile and configured to merge the received image layers mapped to the tile into display data. The processing circuit is further configured to provide the display data to the display screen.

A further implementation is a computer-readable medium having instructions stored therein, the instructions being executable by one or more processors to cause the one or more processors to perform operations. The operations include receiving a request for a webpage and providing, over a network, the request for the webpage to a content source. The operations also include receiving webpage data for the requested webpage, the webpage data including a plurality of image layers. The operations further include mapping the image layers to a destination surface corresponding to pixels of the display screen. The operations also include determining one or more tiles for the destination surface, each pixel of a tile being mapped to the same number and kind of image layers. The operations additionally include utilizing a shader module configured to receive data indicative of the image layers mapped to the tile and configured to merge the received image layers mapped to the tile into display data. The operations further include providing the display data to the display screen.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, image layers may be composited utilizing a GPU shader module. In general, a number of different image layers may be combined to form the finalized image displayed on an electronic display. For example, a webpage may have any number of images, text, etc., that are combined to form the final image of the webpage. In such a case, a picture on the webpage may be on a higher layer than that of the webpage's background, resulting in the background not being displayed in the area where the image is positioned. In some systems, the compositing of image layers may be performed by a software blending module running, for example, on a CPU. According to various implementations, a shader on a GPU may be used instead to composite the image layers.

Figure 1:
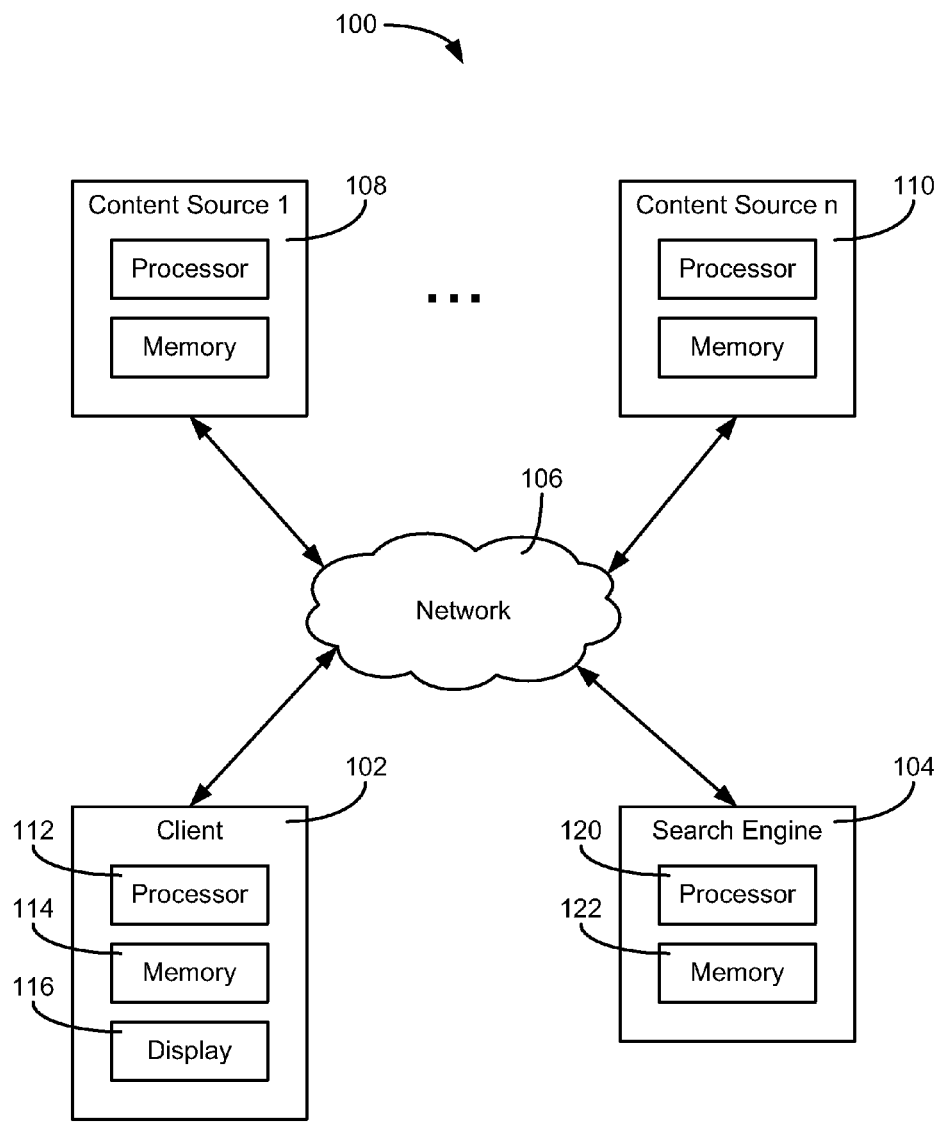
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide webpages and/or other content (e.g., text documents, PDF files, and other forms of electronic documents) to client 102. System 100 may also include a search engine 104, which provides network address information (e.g., a URL, an IP address, an FTP address, etc.) of content sources 108, 110 to client 102 over network 106. For example, client 102 may provide one or more search terms to search engine 104. In response, search engine 104 may provide address information for one or more webpages or other content available from content sources 108, 110 to client 102.

Network 106 may be any form of computer network that relays information between client 102, search engine 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radar, etc.) with a transceiver that is hardwired (e.g., via a fiber optic cable, a CAT5 cable, etc.) to other computing devices in network 106.

Client 102 may be of any number of different types of user electronic devices configured to communicate via network 106 (e.g., a laptop computer, a desktop computer, a tablet computer, a smartphone, a digital video recorder, a set-top box for a television, a video game console, etc.). Client 102 is shown to include a processing circuit, which may comprise a processor 112 and a memory 114. Memory 114 stores machine instructions that, when executed by processor 112, cause processor 112 to perform one or more of the operations described herein. Processor 112 may include a microprocessor, CPU, GPU, ASIC, FPGA, etc., or combinations thereof. In various implementations, processor 112 may comprise a GPU in communication with a CPU. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages and other electronic documents using data received from content sources 108, 110, and/or search engine 104.

Content sources 108, 110 are electronic devices connected to network 106 that may provide content to client 102. For example, content sources 108, 110 may be computer servers (e.g., FTP servers, file sharing servers, web servers, etc.) or other devices that include processing circuits. Content may include, but is not limited to, webpage data, a text file, a spreadsheet, images, and other forms of electronic documents. Similarly, search engine 104 may include a processing circuit including a processor 120 and a memory 122 configured to provide a webpage to client 102. The webpage may include one or more text fields that allow client 102 to generate a search request. Search engine 104 may receive the search request from client 102 via network 106 and provide data indicative of one more network addresses of content sources 108, 110 to client 102. For example, client 102 may request a search webpage from search engine 104 and receive the search webpage, in response. The search webpage may then be used at client 102 to create a search query and to send the search query to search engine 104. In response, search engine 104 may determine one or more network addresses of content on content sources 108, 110 and provide webpage data to client 102 that includes a hyperlink or other address information for the content.

Figure 2:
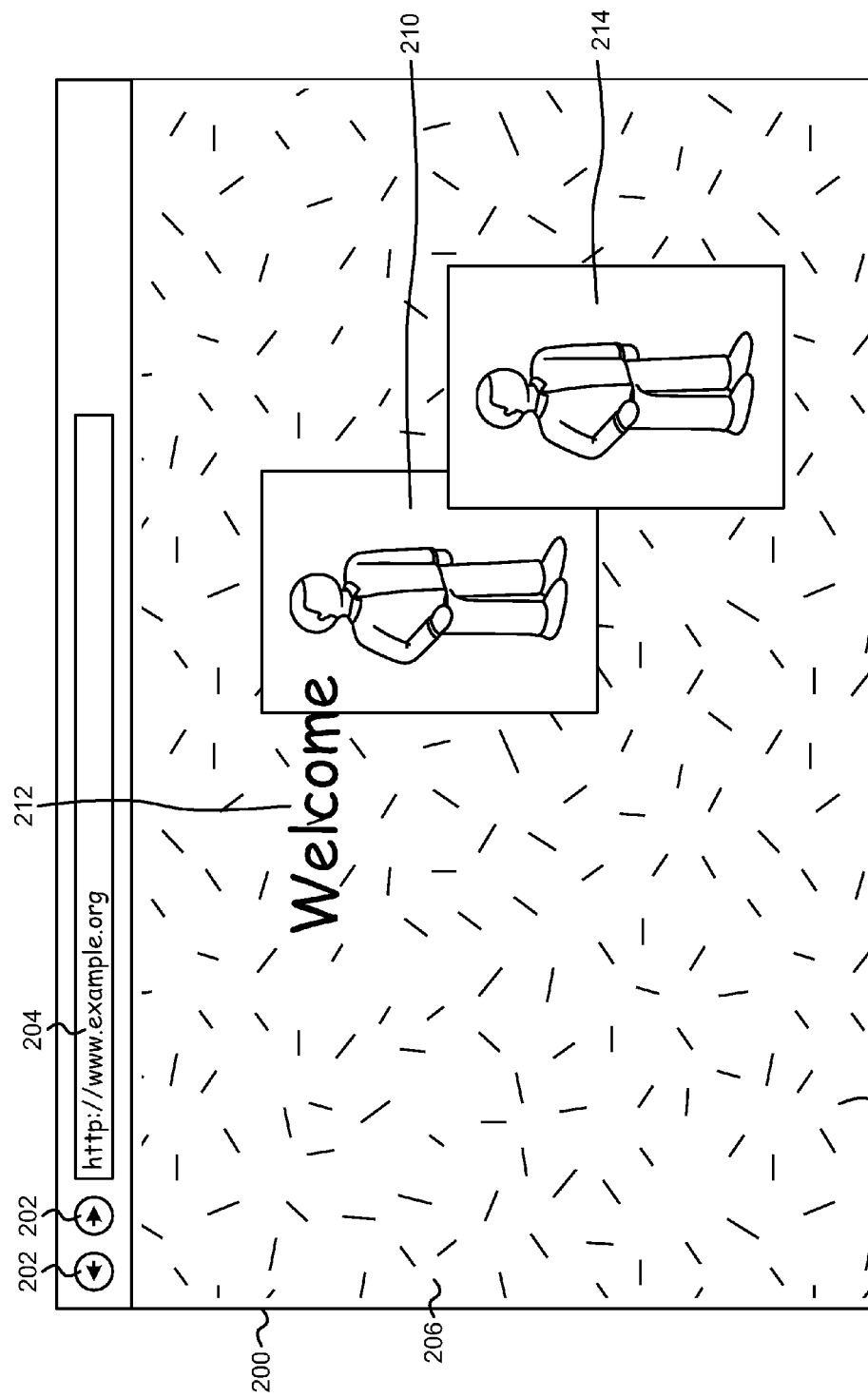
FIG. 2 is an illustration of an example display of a web browser.

Referring now to FIG. 2, an example display 200 is shown. Display 200 is in electronic communication with one or more processors that cause visual indicia to be displayed by display 200. Display 200 may be located inside or outside of the same housing as that of the one or more processors. For example, display 200 may be external to a desktop computer (e.g., display 200 is a monitor), may be a television set, or may be any other stand-alone form of electronic display. In another example, display 200 may be internal to a laptop computer, mobile device, or other computing device having an integrated display.

As shown in FIG. 2, the one or more processors in communication with display 200 may execute a software application, such as a web browser (e.g., display 200 is part of a client device). The web browser operates by receiving input of a resource name or network address into a field 202, such as a web address, from an input device (e.g., a pointing device, a keyboard, a touchscreen, etc.). In response, the one or more processors executing the web browser may request data over a network (e.g., the Internet, an intranet, etc.) from a content source corresponding to the resource name or network address. The content source may provide webpage data and/or other data to the client device which is used to cause visual indicia to be displayed by display 200.

In general, webpage data may include text, hyperlinks, layout information, and other data that is used to provide the framework for the visual layout of displayed webpage 206. In some implementations, webpage data may be one or more files in a markup language, such as the hypertext markup language (HTML), extensible HTML (XHTML), extensible markup language (XML), or any other markup language. For example, the webpage data in FIG. 2 may include a file, "example.html" provided by the website, "www.example.org." The webpage data may include data that specifies where indicia appear on webpage 206, such as graphic 208 or other visual objects. In some implementations, the webpage data may also include additional information used by the client device to retrieve additional indicia displayed on webpage 206. For example, the file, "example.html," may include network address information for the location of graphic 208.

The web browser providing display data to display 200 may include a number of navigational controls associated with webpage 206. For example, the web browser may include the ability to go back or forward to other webpages using inputs 204 (e.g., a back button, a forward button, etc.). In various implementations, inputs 204 may retrieve webpage data again from a content source over a network or may retrieve previously displayed webpage data from a local cache.

The web browser providing display data to display 200 may interpret the webpage content of webpage 206 as any number of different image layers. The different image layers may then be merged by the web browser to form the image of webpage 206 displayed on display 200. For example, webpage 206 may include a background graphic 208, an image 210, text 212, and an image 214. In a simple example, background graphic 208, image 210, text 212, and image 214 may each be determined by the web browser as being on separate layers. In more complicated examples, background graphic 208, image 210, text 212, and image 214 may each include any number of layers themselves. In a further example, background graphic 208, image 210, and image 214 may be part of a single image layer. According to various implementations, a displayed web page may be constructed using at least three, at least five, at least ten, at least 100, or other numbers of layers. The layers of background graphic 208, image 210, text 212, and image 214 may be composited to produce the visual effect of one layer being on top of another on display 200. Visual elements designated by the image layers may be combined from separate sources into a single image to create the illusion that the visual elements are part of a single scene. For example, image 210 may be visually represented as being on top of background graphic 208 on display 200. In various cases, an image layer may be fully opaque, partially opaque, partially transparent, or fully transparent, as denoted by the opacity of the image layer. In general, the opacity of an image layer is a measure of the extent to which the layer allows colors from lower layers to be displayed. For example, the portion of background graphic 208 that corresponds to the placement of image 210 may not be visible at all on display 200 (e.g., image 210 is fully opaque). In another example, image 210 may allow some or all of background graphic 208 to be visible on display 200. In some implementations, portions of an image may also have an associated transparency value, in addition to a layer opacity value.

Figure 3B:
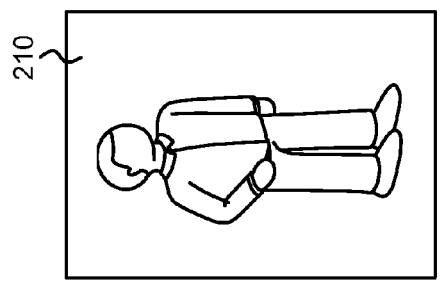
FIGS. 3A-D are example image layers of the webpage shown in FIG. 2.
Figure 3D:
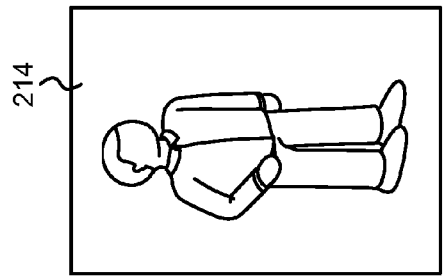
Figure 3C:
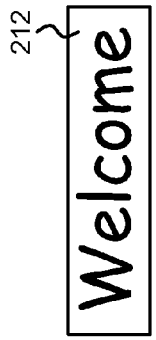
Figure 3A:
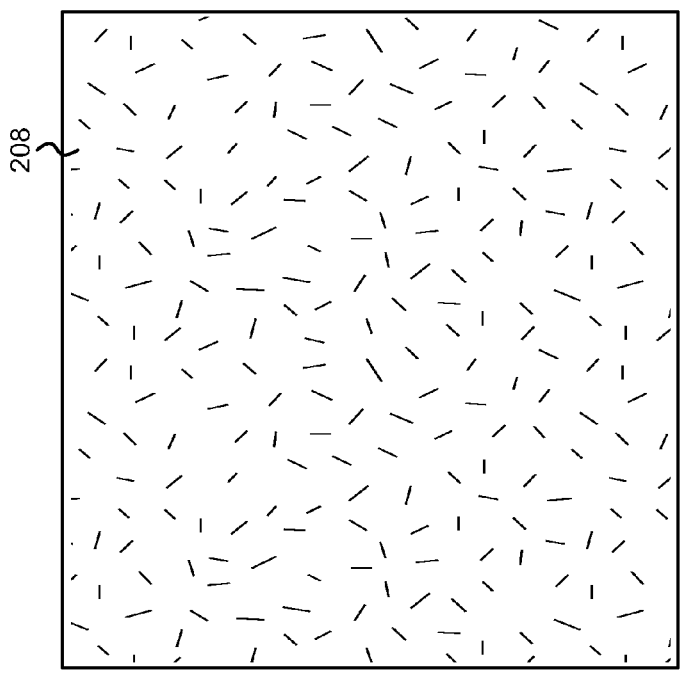

Referring to FIGS. 3A-D, example image layers of webpage 206 of FIG. 2 are shown. FIGS. 3A-D generally depict the various image layers that are merged or composited to produce the image of webpage 206 displayed on display 200. As shown in FIG. 3A, webpage 206 may comprise background graphic 208, which may correspond to the lowest image layer or layers when rendering webpage 206. FIG. 3B depicts image 210, which may correspond to one or more image layers that occupy higher layers than that of background graphic 208, resulting in the visual effect of image 210 being on top of background graphic 208. FIG. 3C depicts text 212, which may correspond to image layers that are higher than that of image 210. FIG. 3D depicts image 214, which may correspond to one or more image layers that occupy higher layers than that of image 210 and background graphic 208, resulting in the visual effect of image 214 being on top of background graphic 208 and image 210. In this way, background graphic 208, image 210, and text 212 may be combined to form the final image of webpage 206 displayed on display 200.

An image layer may have data associated with each pixel in the image, such as a point in color space. For example, pixel information may include data for the colors red, green, and blue (RGB). In some implementations, data referred to as an alpha channel may also be maintained, in addition to RGB data. Such data is sometimes referred to collectively as RGBA data. The alpha channel may be used, for example, to denote the opacity of the pixel. RGBA data may be represented by a set of values that each range from 0-1, according to some implementations (e.g., a value for the color red, a value for the color green, etc.). For example, a pixel may have RGB data of (0.0, 0.0, 0.5), which signifies that the pixel is to have a blue color of 50% intensity. If an alpha channel is used, the pixel may have an RGBA value of (0.0, 0.0, 0.5, 0.5), which signifies that the pixel is to have a blue coloration of 50% intensity and 50% opacity. Various other ways of representing pixel data are also contemplated (e.g., premultiplied alpha values, Gray, GrayA, Indexed, IndexedA, colorimetric data, or any other way of representing pixel information).

In some systems, a process known as alpha compositing may be utilized to combine layers. This process is also sometimes referred to as Porter-Duff blending (named for Thomas Porter and Tom Duff, who proposed the compositing technique) or alpha blending. Blending operations may include "destination over source," "source in destination," "destination in source," and other similar types of operations that specify how the pixels of the different layers are to be combined. A blending module (e.g., a software module that performs compositing) may mathematically combine the color space and opacity data of two pixels to produce a merged result. For images that contain multiple layers, layers may be blended sequentially to produce the final displayed image. For example, layers A, B, and C can be blended in sequential order to produce the finalized pixel (e.g., A+B=AB, AB+C=ABC).

Each blending operation performed by a blending module may require a number of memory operations. For example, pixel data may be read from memory, blended by the blending module to form composite pixel data, and then written by the blending module to memory. The number of operations from using a blending module is proportional to the number of layers that are composited. For example, compositing one hundred image layers requires ninety nine blending operations to produce the final display data. In addition, sequential blending operations do not take into account the characteristics of the input layers. For example, a layer that is fully transparent (e.g., a hidden layer) may still be blended with the other layers, thereby using an extra blending operation that does not affect the outcome. In certain devices, such as smart phones, tablet PCs, game consoles, etc., memory bandwidth may be constrained, potentially impacting the performance of the device when using a blending module to composite image layers.

Figure 4:
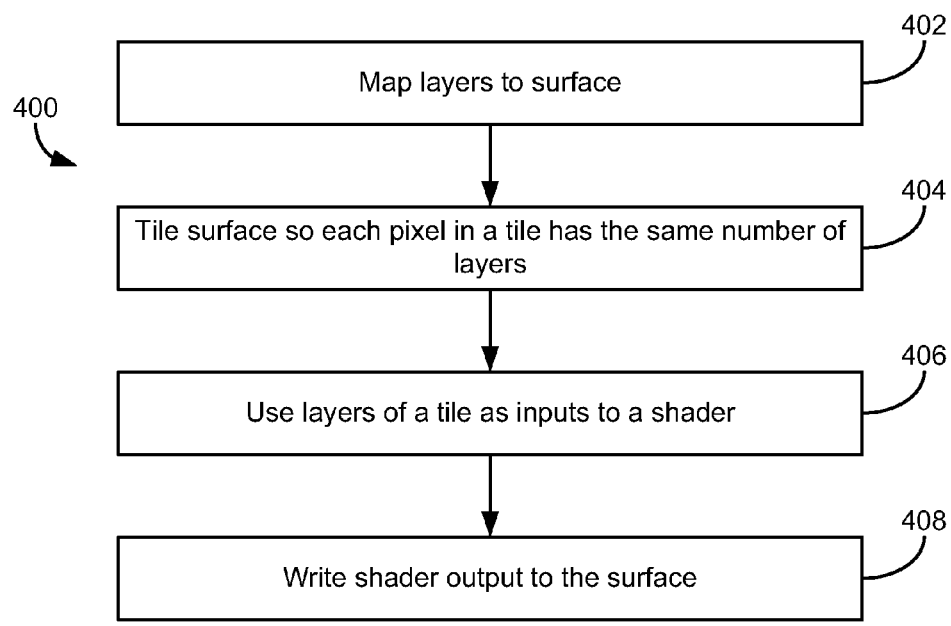
FIG. 4 is an example process for compositing image layers using a shading module on a GPU.

FIG. 4 is an example process 400 for compositing image layers using a GPU shading module. In general, a shading module on a GPU may be used to produce shading effects (e.g., by darkening or lightening certain areas of an image). Shading effects may provide an added sense of depth and realism to a 2D image (e.g., as displayed on a 2D electronic display) to give the appearance of being 3D. Shading effects may, for example, provide the illusion of a lighting source within the image. For example, an image of a tree may include a shadow to the right of the tree, giving the illusion that a lighting source exists somewhere to the left of the tree. In some implementations, GPU shading modules may be more numerous and/or faster than blending modules. For example, a video game may rely more heavily on shading modules than blending modules to produce the final image that is displayed.

In general, GPU shading modules may be classified by the way in which they process visual data. For example, a pixel shader, a vertex shader, or another form of shading module may be used to composite image layers. Pixel shaders operate on a per-pixel basis to produce shading effects, such as a tree casting a shadow. For example, lighting and shading effects can be created by a pixel shader that adjusts the color and/or intensity of an individual pixel. A vertex shader processes visual data that is divided into polygons, such as triangles.

Each triangle may include a number of individual pixels and may be defined by its vertices. Many applications that simulate 3D effects on a 2D electronic display utilize triangles to represent visual data. For example, a tree that appears to be in 3D may be rendered using a mesh of polygons, such as triangles, to represent the bark of the tree. Each triangle of the bark may have associated color and/or intensity values that differ from other triangles, thereby producing the visual effect of the trunk of the tree being curved. According to various implementations, pixel shaders, vertex shaders, a combination of pixel shaders and vertex shaders, and/or other forms of GPU shaders may be utilized to composite image layers.

Process 400 includes mapping image layers to a destination surface (block 402). A destination surface may correspond to the screen of an electronic display or a portion of the screen. For example, image layers corresponding to visual components of a webpage may be mapped to a portion of a display screen in which a window of a web browser is to be displayed. In other implementations, the destination surface may correspond to any displayed portion of a software program. For example, a filesystem window of an operating system, a desktop in an operating system, a displayed video game, etc., may be treated as the destination surface. In one example, the image layers of a webpage may be positioned on the surface as part of the mapping. For example, an image on the webpage may be positioned in the top right corner of the window, while text may be positioned in the center of the window. A background image may be positioned across the entirety of the window of the web browser.

Process 400 includes tiling the surface so that each pixel in a tile has the same number and kind of mapped image layers (block 404). In general, a tile may be a group of one or more pixels on the surface that is written to after the image layers are composited. Since visual elements may be mapped to different portions of the surface, the number of image layers associated with a pixel of the surface may vary across the surface. A portion of the surface having the same number and kind of mapped image layers may be divided into one or more tiles. For example, an 8×8 square of pixels each having the same number and kind of mapped image layers may be divided into four 4×4 tiles of pixels, sixteen 2×2 tiles of pixels, etc. In some cases, a portion of the surface may be divided into tiles having one pixel per tile. Each tile may be of a polygonal shape, such as triangular, according to some implementations. In this way, each tile may have the same number and kind of mapped image layers, allowing a single shader module to process the image layers at once.

Process 400 includes using the image layers of a tile as inputs to a shader module on a GPU (block 406). Since each pixel in a tile has the same number of layers, a shader module can be created to perform the compositing operations (e.g., as opposed to using a blender module) that takes as input textures representing an image layer, texture coordinates mapping texels to pixels, and/or other parameters. In various implementations, the shader module may be defined using a shading language, such as the OpenGL Shading Language (GLSL), the High Level Shader Language (HLSL), C for Graphics (Cg), or the like. In some implementations, the shader module may be defined dynamically based on the number of image layers associated with a specific tile.

In some implementations, different shader modules may be defined based on the number and type of layers in a given tile. Referring again briefly to FIG. 2, for example, different tiles may be constructed for the areas in which text 212 overlaps image 210 and for the area in which images 210, 214 overlap. While both tiles may contain the same number of layers to be combined, the kind of layers differ. In such a case, different GPU shaders may be defined to handle the different tiles (e.g., a shader configured to composite the tile containing text/image information and a shader configured to composite the tile containing image/image information). Every pixel in a text/image tile may be rendered as a pixel of text on top of a pixel of the image and, in general, each pixel throughout a given tile may represent a composition of the same kinds of layers. Thus, defined shader modules may be reused to perform compositing on different tiles, so long as the tiles contain the same number and kind of layers.

Utilizing a shader module to composite image layers allows the image layers to be composited at the same time, thereby reducing the number of memory read/writes needed to composite the image layers. In some implementations, hidden layers may be excluded from being processed by a shader module, thereby also reducing the set of image layers to be composited. In this way, memory bandwidth is conserved over that of using a blending module to perform the compositing operations.

Process 400 includes writing the shader module output to the surface (block 408). The image layers used as input to the shader module are composited by the shader module into a single image layer. For example, a shader module that receives a tile having three mapped image layers as inputs may composite the image layers into a single image layer. The resulting output data may then be written to the surface, i.e., used as part of the finalized display data provided to an electronic display.

Figure 5:
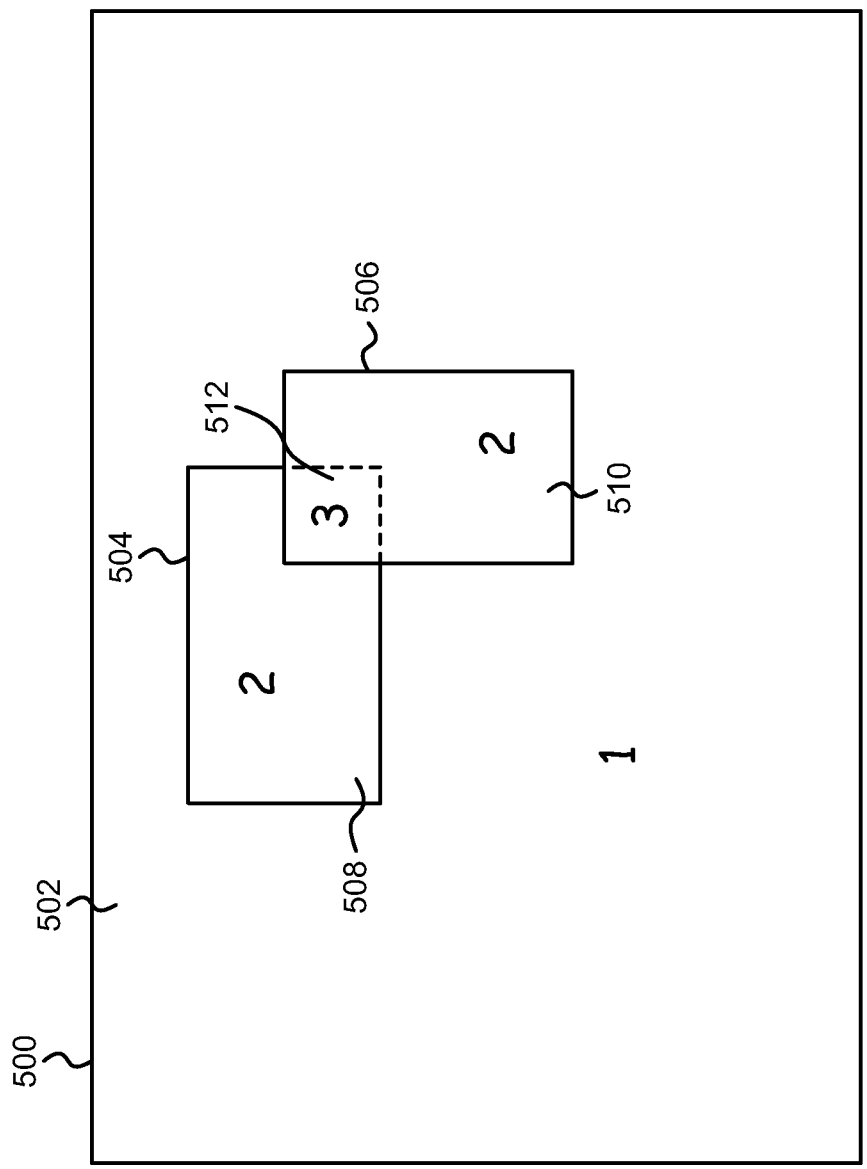
FIG. 5 is an illustration of an example tiling of image layers onto a surface.

FIG. 5 is an illustration of an example tiling of image layers onto a surface 500. Surface 500 may correspond to a set of pixels of an electronic display. For example, surface 500 may correspond to a displayed window or portion of a window of a web browser or other application, or may correspond to a window displayed as part of an operating system. As shown, visual objects 502, 504, 506 may be mapped to surface 500 in various locations. Each of visual objects 502, 504, 506 may occupy a different image layer, creating the visual illusion that some visual objects 502, 504, 506 are closer to a user viewing the electronic display than others. For example, visual object 502 may occupy the lowest image layer, visual object 504 may occupy an intermediate image layer, and visual object 506 may occupy the highest image layer.

Two or more image layers may be mapped to a portion of surface 500. For example, two image layers are shown to be mapped to area 508 of surface 500. Area 508 of surface 500 may correspond to visual object 504 layered on top of visual object 502. Similarly, area 510 of surface 500 may have two associated image layers corresponding to visual object 506 on top of visual object 502. Any number of image layers may be mapped to an area of a surface. For example, area 512 may have three associated image layers, corresponding to visual object 506 on top of visual objects 504, 502, respectively.

Surface 500 may be tiled such that each pixel in a given tile has the same number of associated image layers. For example, each pixel of surface 500 in area 512 has three associated image layers corresponding to visual objects 502, 504, 506, respectively. Therefore, area 512 may be divided into any number of tiles (e.g., groups of pixels). For example, area 512 may be divided such that each tile is a 2×2 square of pixels or may be a single pixel, itself. Similarly, areas 508, 510 may also be divided into any number of tiles. Tiles determined in this way can then be used as inputs to a GPU shading module to merge the image layers of the tile into display data. For example, area 512 may be divided into two triangles and the image layers mapped to area 512 in the triangles may be used to provide input to a pixel shading module. In response, the pixel shading module may composite the input data and generate display data for area 512.

While some implementations are described herein with reference to utilizing a GPU shader to composite image layers within a web browser application, other implementations are also contemplated. For example, an operating system may utilize the techniques described herein to render image data for an open window or on a desktop. In another example, a video game may utilize the described techniques to render a user interface. Any computerized application may use the compositing techniques described herein.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "client" and "server" include all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA, a GPU, or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). Further implementations may not be configured to communicate over a network.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computerized method for rendering an image on a display screen of an electronic display comprising:
   receiving, at a processing circuit, a plurality of image layers;
   mapping the image layers to a destination surface corresponding to pixels of the display screen;
   determining, by the processing circuit, one or more tiles for the destination surface, wherein each pixel of a respective tile is mapped to a number of image layers;
   dynamically generating, without user intervention, one or more shader modules for the one or more tiles, each shader module being generated based on the number of image layers and kind of image information within the image layers for at least one of the one or more tiles;
   utilizing each shader module for tiles associated with a same respective number of image layers containing a respective kind of image information; and
   providing the display data to the display screen.

2. The method of claim 1, wherein at least one of the shader modules is further configured to disregard processing of a hidden image layer.

3. The method of claim 1, wherein the plurality of image layers comprise webpage data.

4. The method of claim 3, wherein the webpage data comprises text and one or more images for the webpage.

5. The method of claim 1, wherein at least one of the shader modules is a pixel shader.

6. The method of claim 1, wherein one or more tiles utilized by a respective one of the shader modules comprises texture data.

7. The method of claim 1, wherein the plurality of image layers comprise windows in an operating system.

8. A system for rendering an image on a display screen of an electronic display comprising a processing circuit comprising a CPU and a GPU,
   wherein the processing circuit is configured to receive a plurality of image layers at the CPU and to map the image layers to a destination surface corresponding to pixels of the display screen,
   wherein the processing circuit is configured to determine one or more tiles for the destination surface,
   wherein each pixel of a respective tile is mapped to a number of image layers,
   wherein one or more shaders for the one or more tiles are generated without user intervention, each shader module being generated based on the number of image layers and kind of image information within the image layers for at least one of the one or more tiles, wherein the processing circuit is configured to utilize each shader module for tiles associated with a same respective number of image layers containing a respective kind of image information, wherein the processing circuit is configured to provide the display data to the display screen.

9. The system of claim 8, wherein at least one of the shader modules is further configured to disregard processing of a hidden image layer.

10. The system of claim 8, wherein the plurality of image layers comprise webpage data.

11. The system of claim 10, wherein webpage data comprises text and one or more images for the webpage.

12. The system of claim 8, wherein at least one of the shader modules is a pixel shader.

13. The system of claim 8, wherein one or more tiles utilized by a respective one of the shader modules comprises texture data.

14. The system of claim 8, wherein the plurality of image layers comprise windows in an operating system.

15. The system of claim 8 comprising a mobile device, wherein the mobile device comprises the processing circuit.

16. A computer-readable medium having instructions stored therein, the instructions being executable by one or more processors to cause the one or more processors to perform operations comprising:

receiving a request for a webpage;

providing, over a network, the request for the webpage to a content source;

receiving webpage data for the requested webpage, wherein the webpage data comprises a plurality of image layers;

mapping the image layers to a destination surface corresponding to pixels of the display screen;

determining one or more tiles for the destination surface, wherein each pixel of a respective tile is mapped to a number of image layers;

dynamically generating, without user intervention, one or more shader modules for the one or more tiles, each shader module being generated based on the number of image layers and kind of image information within the image layers for at least one of the one or more tiles;

utilizing each shader module for tiles associated with a same respective number of image layers containing a respective kind of image information; and providing the display data to the display screen.

17. The computer-readable medium of claim 16, wherein the webpage data comprises text and one or more images for the webpage.

18. The computer-readable medium of claim 16, wherein at least one of the shader modules is a pixel shader.

19. The computer-readable medium of claim 16, wherein one or more tiles utilized by a respective one of the shader modules comprises texture data.

20. The computer-readable medium of claim 16, wherein at least one of the shader modules is further configured to disregard processing of a hidden layer.

* * * * *